Feb. 16, 1965 A. M. BARRETT, JR 3,169,733
BATTERY CHARGING SYSTEM FOR VEHICLES
Filed Oct. 1, 1959 3 Sheets-Sheet 1
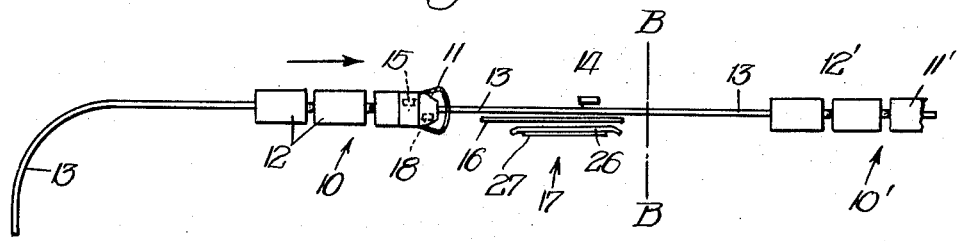
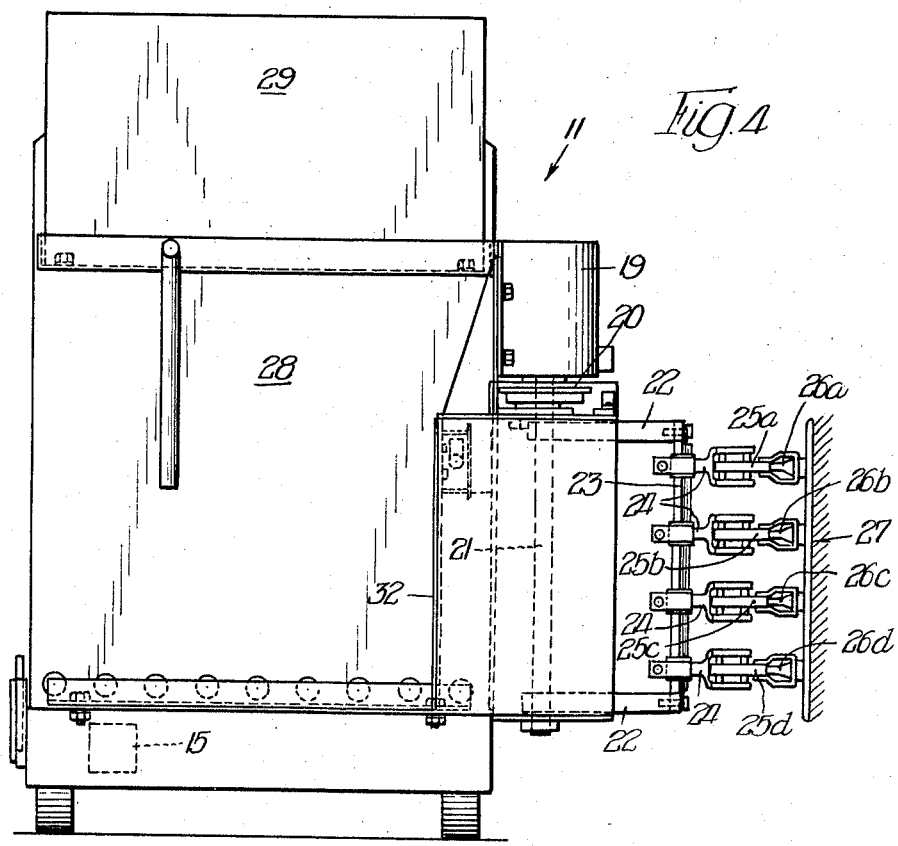
INVENTOR.
Arthur M. Barrett, Jr.,
BY
Brown, Jackson, Boettcher & Dienner
Attys

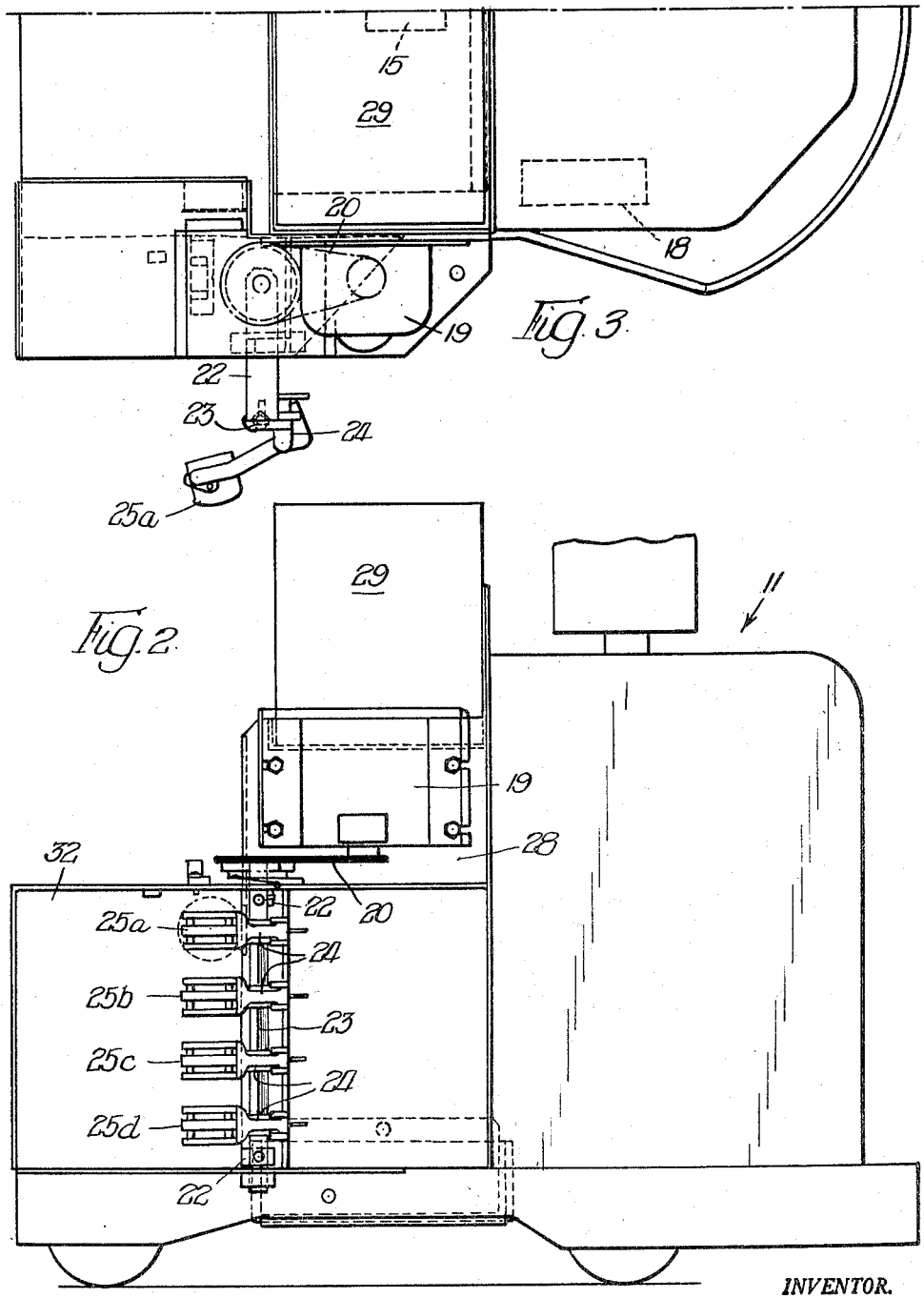

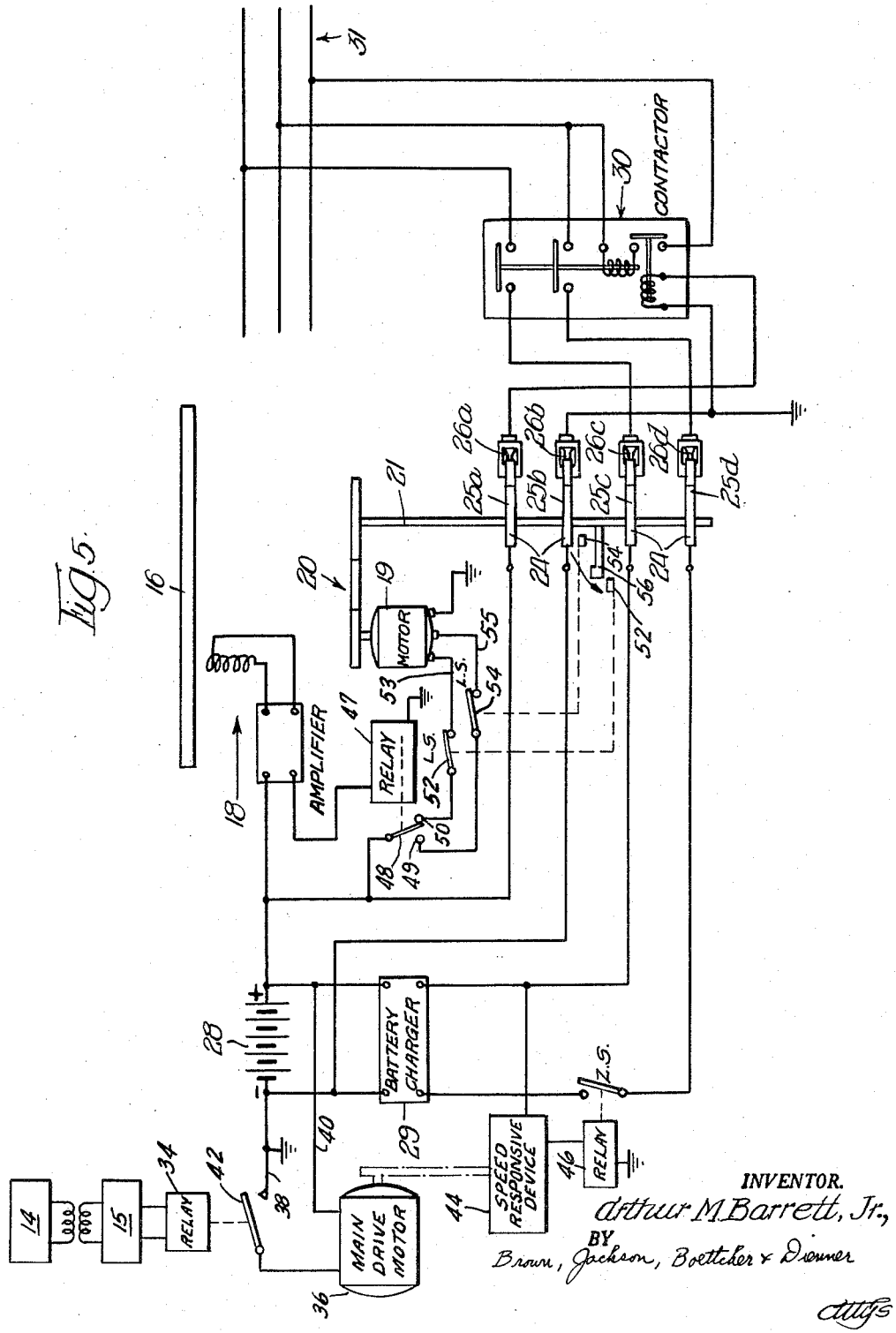

United States Patent Office 3,169,733
Patented Feb. 16, 1965

3,169,733
BATTERY CHARGING SYSTEM FOR VEHICLES
Arthur M. Barrett, Jr., Northbrook, Ill., assignor to Barrett Electronics Corporation, Northbrook, Ill., a corporation of Illinois
Filed Oct. 1, 1959, Ser. No. 843,878
7 Claims. (Cl. 246—30)

My invention pertains generally to a battery charging system for vehicles, and more particularly to a system for battery-powered operatorless vehicles for charging the batteries while the vehicles are temporarily idled during their normal operations.

The invention is particularly suited for an operatorless vehicle such as a towing tractor which may be used in material handling, and for purposes of illustration will be shown and described in such usage, although the invention is not limited to such use.

Systems of material handling have been developed which employ self-powered vehicles adapted, for example, to draw a train of platform trucks, with the vehicles being automatically guided optically or magnetically or in some other manner along pre-selected paths. Being automatically controlled in that fashion, they require no man to operate them and therefore greatly reduce the expense of materials handling. In a particular pre-selected path there may be a series of vehicles and their trains in operation. To ensure suitable spacing of the trains and to avoid collisions, a block control system of the entrance-exit type may be employed. A block signal for a following vehicle may stop it at a block point until the preceding vehicle has cleared a certain point in the path ahead. It will be understood, however, that the use of my invention is not confined to a "block control" system.

Where, for example, the vehicles are to operate indoors, it is desirable that their self-propulsion not result in noxious exhaust fumes, and so they are battery powered. In the course of a given distance, and related to the load moved, the charge of these batteries is reduced and it becomes necessary to re-charge them. It has been customary to do this at a charging station maintained for the purpose and located away from the path of operations. Also, it has been the practice to take the vehicles to the charging station at the end of a day or at the end of some other given period of time. Such arrangement has difficulty taking into account varying loads, distances traveled, and different conditions of batteries. Consequently, unless recharging is programmed at frequent intervals, a vehicle may be stopped while in use by reason of its batteries "going dead." That results in all succeeding vehicles and trains behind it being stopped, with consequent delay, confusion and additional labor.

Also the aforementioned recharging program is unsuited to materials handling which is on a round-the-clock, or similarly extended, basis since there is too much switching of the tractor vehicle from its train to a charging station and back.

Accordingly it is an object of my invention to conserve time spent in charging the batteries of the tractor vehicle.

It is a further object to provide a battery charging system which will permit the vehicle to remain in more continuous use in moving materials.

To this end I provide a system whereby a series of vehicles operating over a given path, or track, can have their batteries charged while carrying on their materials-moving function. Briefly, this is accomplished by providing a battery charging station alongside the path adjacent a block point in the block signal system with automatically controlled means for electrically connecting the vehicle to the battery charging station and for initiating the charging function. Consequently, instead of a vehicle's time being wasted at a block point, its battery is being recharged. This eliminates "down" time which otherwise results from the vehicle's batteries going dead or the vehicle being taken out of service for charging. As a result, there is more efficient and more economical use of the expensive tractor vehicles because they are in service for longer periods of time and require no labor for charging the batteries, the charging being automatically performed by my system.

Other advantages and uses of my invention will be apparent, or become so, as I describe my invention in greater detail in conjunction with the accompanying drawings in which:

FIGURE 1 is a fragmentary diagrammatic representation of a transportation path having a block signal system, vehicle drawn trains, and my battery charging system;

FIGURE 2 is a side elevation of an operatorless vehicle with equipment used in my automatic battery charging system;

FIGURE 3 is a fragmentary top plan view of the vehicle of FIGURE 2;

FIGURE 4 is a rear elevation of the vehicle of FIGURE 2 and includes the contact rails of the charging station; and FIGURE 5 is a simplified electric circuit showing the movable contacts on the vehicle about to engage the contact rails at the battery charging station.

Referring now to FIGURE 1, there is illustrated generally, a vehicle-drawn train 10 comprising an operatorless tractor type vehicle 11 to which are connected one or more platform trucks 12 with train 10 following a path 13 laid out in advance for the vehicle to follow optically or magnetically or otherwise. Train 10 is moving in the direction of the arrow and is approaching a stationary train 10' which lies ahead in the next "block" of the block signal system. The block in which train 10' is stopped extends approximately from the dot-dash line B—B to the right, as viewed in FIGURE 1, and it may be assumed that train 10' has not yet exited from its block. Its presence therefore initiates a "signal" at the block signal, or beacon, 14 and that signal will be sensed in a known manner by a sensing means 15 carried by vehicle 11 and will cause the train 10 to be stopped. The beacon 14 may be an electro-magnet coil and the "signal" may be a magnetic field which the coil generates. The block signal system and the mechanism for stopping the vehicle do not of themselves constitute my invention and may take different known forms; for example, see Patent Nos. 2,768,286, 2,606,281, 2,817,012 and 2,164,331.

As the vehicle 10 approaches the beacon 14 it first reaches a second beacon 16 which precedes and extends along and beyond the charging station, indicated generally by the reference numeral 17. A second sensing means 18 carried by the vehicle 11 responds to the continuous "signal" of the beacon 16 and establishes a circuit and energizes, automatically, an enclosed reversible motor 19 (FIG. 3) carried on the vehicle 11. The beacon and sensing means per se also do not constitute my invention and may take different forms. For example, they may be similar to those of the above mentioned patents and can actuate the motor 19 instead of shutting off a motor or operating a braking system. Also see Patent Nos. 2,589,478 and 2,533,116 for remotely operated motors responsive to signal means from one of two relatively movable structures.

Referring now to FIGURES 2 through 4 the motor 19 powers a sprocket and chain drive, indicated generally at 20, which rotates a shaft 21 to which are secured a pair of spaced apart horizontally extending arms 22. Between the arms 22 is secured a vertical supporting bar 23 on which are fixed four contact carrying arms 24 each having a contact, or collector. The contacts 25a, 25b, 25c and 25d are adapted to be moved into engagement with four associated contact rails 26a, 26b, 26c and 26d (FIGS. 1 and 4) when the vehicle 11, through its sensing means 18, has sensed the beacon 16, as the vehicle approaches the charging station 17. The contact rails may be supported in spaced, parallel, horizontal relationship by a suitable support 27. The batteries 28 ride on the vehicle 11 and power the driving motor (not shown) for the vehicle. The battery charging mechanism is indicated at 29.

In operation, when the train 10 moving along path 13 comes to beacon 16, sensing means 18 on vehicle 11 will detect the "signal" from the beacon 16 and cause the motor 19 to be energized. Motor 19, through its drive mechanism 20, will cause the arms 22 and bar 23 and the associated contact carrying arms 24 with their respective contacts to be swung through a 90° angle from their retracted positions alongside the vehicle 11 to an extended position (as in FIGURES 2, 3 and 4) to engage the contact rails. (FIGURE 5, however, illustrates the circuit with a movable contact 25a, 25b, 25c and 25d just about to engage the contacts 26a, 26b, 26c, and 26d of the contact rails 27 and at this moment both limit switches (L.S.) are closed.) The upper one of the pair of limit switches, diagrammatically indicated at L.S. in FIGURE 5, is then actuated to open position and the reversible motor then stops. At this time the lower limit switch L.S. is closed. A similar type of operation in this manner of a motor with a pair of limit switches may be seen in Patent No. 1,644,545. Contacts 25a and 25b when engaged with contact rails 26a and 26b include in their circuit the batteries 28 which energize the contactor 30 (FIG. 5) and thereby cause contact rails 26c and 26d and their engaged contacts 25c and 25d to be connected to a source of electrical energy 31, such as a 220 volt line. Though the battery charger 29 is then in the circuit which includes the source of electrical energy 31, the circuit is not completed and no charging occurs unless beacon 14, sensing a train in the block ahead, blocks the vehicle 11. In addition to the United States patent referred to earlier herein which describe block signal systems, reference may also be had to U.S. Patent 2,847,080, issued August 12, 1958, which describes an automatic control system for vehicles in which under certain conditions a warning block will radiate a signal which is picked up by a receiver on the vehicle as the latter approaches the warning block so as to actuate a relay and associated contact members thereby to deenergize a vehicle drive motor and cause the vehicle to stop.

When the beacon 14 does signal a train in the block ahead, then the sensing means 15 on the vehicle responds to it by stopping the driving motor of the vehicle, as by actuating a suitable relay. Referring to FIGURE 5, there is shown a main drive motor 36 connected to the battery 28 by leads 38 and 40, and there is further shown a normally closed switch 42 in the motor circuit which is opened upon operation of an associated relay 34. The relay 34 is operated by the sensing means 15 when the latter senses a signal from the beacon 14. When the vehicle 10 is thus stopped, such stopping is sensed by a speed responsive device 44 which actuates a relay 46 to close a normally open "zero speed" switch Z.S. thereby closing the circuit which includes the battery charger 29. The zero speed switch may take any one of a number of known forms and may detect the stopping of the vehicle through different parts of the vehicle which cease to move when the vehicle slows down and ceases to move. Two forms of zero speed switches are shown in Patents Nos. 2,486,864 and 2,859,295. Then, while the train 10 is blocked, the batteries 28 of the vehicle are charged until the train 10' ahead of it exits from the block. When that happens beacon 14 ceases to emit a signal and sensing means 15 ceases to receive any signal, whereupon the driving motor (not shown) of the vehicle is re-energized and the circuit, including the battery charger, is opened by reason of the zero speed relay being actuated by movement of the vehicle.

Train 10 then moves forward and, after the contacts 25a, 25b, 25c and 25d have ridden free of the respective contact rails, sensing means 18 moves beyond beacon 16 and thus ceases to receive any further signal, whereupon the "Relay" is disabled and the reversible motor 19 is thereby energized to reversely rotate the contacts from their extended position back 90° to their retracted position alongside the vehicle within the housing 32. At that time the lower limit switch L.S. (FIGURE 5) opens, the motor stops, and the motor circuit is conditioned for its next operation by the upper limit switch L.S. being closed. More specifically, FIGURE 5 shows a switch arm 48 and a pair of terminals 49 and 50 which provide alternate forward and reverse circuits to the reversible motor 19. The upper limit switch shown at 52 is biased to closed position and is associated with the shaft 21 so as to be opened whenever the shaft is rotated to the position where the vehicle contact terminals 25 are fully extended. The lower limit switch shown at 54 is also biased to closed position and is associated with the shaft 21 so as to be opened when the shaft is rotated to the position where the vehicle terminals 25 are fully retracted. The limit switches 52 and 54 are radially spaced from the shaft 21 and are disposed in the same horizontal plane as a switch-actuator arm 56 which is mounted on the shaft 21 for rotation therewith, and the two switches are arcuately spaced apart approximately 90 degrees to permit opening thereof by the arm 56 at the proper times as indicated above. The switch arm 48 is normally engaged against the terminal 49, but when the sensing means 18 receives a signal from beacon 16, the sensing means operates relay 47 which in turn moves the switch arm 48 into engagement with the terminal 50. Accordingly, when sensing means 18 receives a signal, a circuit is completed from the battery 28 through switch arm 48 and terminal 50 to closed limit switch 52 and lead 53 to the motor 19 to cause the vehicle terminals 25 to be extended, and when such terminals are extended, limit switch 52 will open to stop the motor. When sensing means 18 ceases to receive a signal, relay 47 will deenergize and switch arm 48 will again engage terminal 49 thus completing a circuit from the battery 28 through closed limit switch 54 and motor lead 55 so as to cause the vehicle terminals 25 to be retracted. When the vehicle terminals 25 are fully retracted, limit switch 54 will open to stop the motor 19.

In the event that the train was not stopped by the blocking beacon 14, contacts 25a, 25b, 25c and 25d would have merely ridden along against the contact rails, without initiating any battery charging action, and then been retracted when sensing means 18 had passed beacon 16. From this it may be seen that at no time is the vehicle in idleness. It is either drawing a load or, when blocked from doing so, is having its batteries charged, and in either event the operation is automatic.

While I have illustrated my invention by a tractor type vehicle for materials handling it will be understood that it is applicable to any battery powered vehicle which is automatically guided along a path. It will also be readily appreciated that my battery charging system could be employed other than along the operational path, that is, by switching the vehicle to a siding. Also it may be used in other than a block signal type of system, and it need not be an operatorless vehicle. Therefore, while I have illustrated my invention in a preferred form, I do not intend to be limited to that form, except insofar as the appended claims are so limited, since modifications coming within the scope of my invention will be readily suggested to others with my disclosure before them.

I claim:

1. A battery charging system for a battery-powered vehicle which is adapted to follow a path and in which system an automatic block signal system is provided along said path to stop one of said vehicles at a location to prevent the vehicle from too closely following another vehicle along said path, said system comprising a battery charging station disposed adjacent said path and adapted to provide a source of electrical energy and including a pair of electrical terminals, battery charging means, electrical terminals carried by said vehicle each one of said terminals having a retracted position and an extended position, means for actuating the vehicle terminals to the retracted and extended positions, and when the vehicle arrives at said battery charging station, adapted to actuate the vehicle terminals to the extended position to engage with the first mentioned terminals to provide, upon stopping of the vehicle, a conductive path including said battery charging means, the battery of the vehicle, and the source of electrical energy.

2. The system of claim 1, together with signal means, and signal sensing means carried by the vehicle, said means for actuating the vehicle terminals being responsive to said signal sensing means for causing movement of the electrical terminals carried by the vehicle to their extended position.

3. In a battery charging system for a vehicle which has a battery-powered driving motor and which is adapted to be automatically guided along a path, a battery charging station disposed adjacent said path, battery charging means carried by the vehicle, electrical energy supplying means including contact rails and first switch means disposed at the battery charging station and operatively associated with said rails, first beacon means and second beacon means, first sensing means and second sensing means carried by the vehicle, said first sensing means being responsive to the first beacon means which is disposed alongside the path in advance of and along and a distance beyond said station, contact arms adapted to engage the rails at the battery charging station, said arms being mounted on the vehicle and movable between a rail engaging position and a retracted position, reversible motor means for moving said arms, said motor means being responsive to the first sensing means responding to the first beacon means to cause said contact arms to be swung out into a position in which they will engage said rails, whether or not the vehicle stops at the battery charging station, a first pair of said contact arms including the battery charger and second switch means in their conductive path and a second pair of said contact arms including the battery in their conductive path, the second switch means being closed after said second sensing means de-energizes the vehicle's driving motor in response to a signal from said second beacon means, whereby the first switch means is actuated to closed position upon being connected to said battery through said second pair of contact arms and completes a circuit from said electrical energy supplying means through the first pair of contact arms and said battery charging means to cause the battery to be charged, the vehicle being adapted, when said second beacon means ceases to give its signal, to move along its path away from the battery charging station by reason of the vehicle's driving motor being re-energized, the reversible motor means carried by the vehicle thereafter moving said contact arms into retracted position.

4. A battery charging system for battery-powered vehicles which are adapted to be automatically guided along a main path and in which system an automatic block signal system is provided along said path to stop one of said vehicles at a location to prevent the vehicle from too closely following another vehicle along said path, said system comprising a battery charging station disposed immediately adjacent said main path at the location where the block signal system is adapted to stop the vehicle, battery charging means including a battery charger and vehicle terminal means, said battery charging means normally being inoperative but being adapted upon being rendered operative to cooperate with said charging station to effect charging of the vehicle battery, beacon means for producing a signal, signal-sensing means carried by the vehicle and adapted to sense said signal as the vehicle approaches said charging station, and actuating means for rendering said battery charging means operative upon stopping of the vehicle at said charging station to cooperate with said charging station to effect charging of the vehicle battery, said actuating means being responsive to said signal-sensing means sensing said signal.

5. A battery charging system for a battery-powered vehicle which is adapted to follow a path and in which system an automatic block signal system is provided along said path to stop one of said vehicles at a location to prevent the vehicle from too closely following another vehicle along said path, said system comprising a battery charging station disposed adjacent said path and adapted to provide a source of electrical energy and including a plurality of electrical terminals, battery charging means, electrical terminals carried by said vehicle, each one of said vehicle terminals having a retracted position and an extended position, signal means, signal sensing means carried by the vehicle, and actuating means responsive to said signal sensing means for moving said vehicle terminals between their extended and retracted positions, said actuating means being adapted to move said vehicle terminals to extended position when a signal is received from said signal means and to thereafter move said vehicle terminals to retracted position when the signal ceases to be received from said signal means, whereby when a signal has been received by said signal sensing means and the vehicle arrives at said battery charging station the vehicle terminals will be moved to extended position to engage with the first mentioned terminals to provide upon stopping of the vehicle a conductive path including said battery charging means, the battery of the vehicle and the source of electrical energy.

6. In combination, a battery powered vehicle adapted to move along a path, a battery charging station associated with said path and including contact terminals adapted to be connected with a source of current, battery charging means for connection with said battery and adapted to be connected with said source of current through said contact means, contact terminals on said vehicle each one of said terminals being movable between retracted and extended positions, the latter position providing contact between the vehicle terminals and said first mentioned contact terminals when the vehicle is at said charging station, motor means carried by the vehicle for moving said movable contact terminals from a retracted position to the extended position in contact with said first mentioned contact terminals and then to a retracted position, sensing means carried by the vehicle, beacon means adapted to be sensed by said sensing means, and means responsive to said sensing means for initiating operation of said motor means.

7. A battery charging system for a battery-powered vehicle which is adapted to follow a path and in which system an automatic block signal system is provided along said path to stop one of said vehicles at a location to prevent the vehicle from too closely following another vehicle along said path, said system comprising a battery charging station disposed adjacent said path and adapted to provide a source of electrical energy, battery charging means, a first group of electrical terminals at said charging station, a second group of corresponding electrical terminals carried by said vehicle, one of said groups of terminals consisting of a plurality of movable terminals each one of which has a retracted and an extended position, and actuating means for actuating said one group of movable terminals between retracted inoperative positions and extended positions wherein they are adapted to engage the corresponding terminals of the other of said groups, said actuating means being adapted to be operated upon arrival of the vehicle at said battery charging station to move said one group of movable terminals to their extended positions to engage with said other group of terminals whereby upon stopping of the vehicle there is provided a conductive path including said battery charging means, the battery of the vehicle, and the source of electrical energy.

References Cited in the file of this patent

UNITED STATES PATENTS

| | | |
|---|---|---|
| 1,644,545 | Robertson | Oct. 4, 1927 |
| 1,731,908 | Regalmuto | Oct. 15, 1929 |
| 2,025,106 | Hershfeld | Dec. 24, 1935 |
| 2,117,030 | Larsson | May 10, 1938 |
| 2,486,864 | Mitchell | Nov. 1, 1949 |
| 2,533,116 | Jenkins | Dec. 5, 1950 |
| 2,589,453 | Storsand | Mar. 18, 1952 |
| 2,589,478 | Curtis | Mar. 18, 1952 |
| 2,606,281 | Thomas et al. | Aug. 5, 1952 |
| 2,626,673 | Storsand | Jan. 27, 1953 |
| 2,768,286 | Kendall | Oct. 23, 1956 |
| 2,778,890 | Storsand | Jan. 22, 1957 |
| 2,817,012 | Kendall | Dec. 17, 1957 |
| 2,859,295 | Weidig | Nov. 4, 1958 |
| 2,951,452 | Karlet | Sept. 6, 1960 |